July 21, 1936.  R. CHILTON  2,048,057
ENGINE STARTING APPARATUS.
Original Filed Jan. 30, 1929
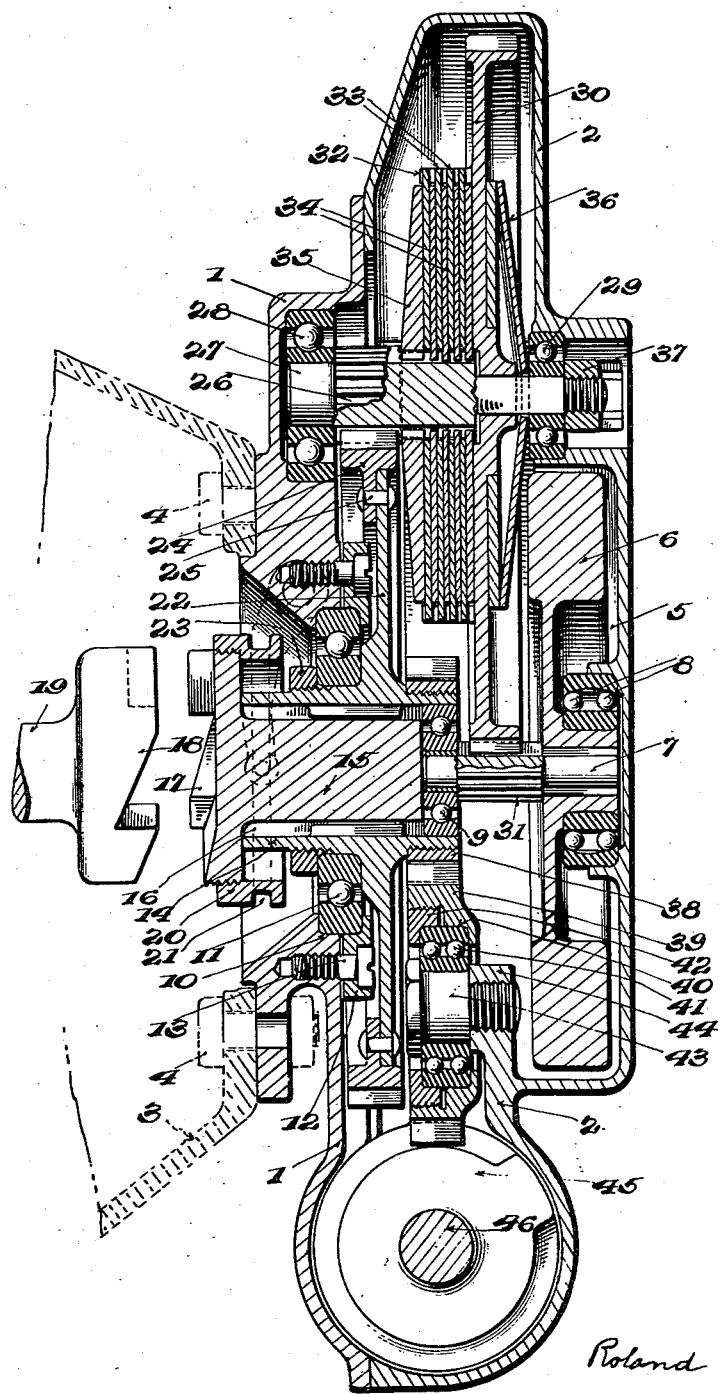
Inventor
Roland Chilton
By
Cameron Kerkam & Sutton
Attorneys Patented July 21, 1936

2,048,057

UNITED STATES PATENT OFFICE 2,048,057

ENGINE STARTING APPARATUS

Roland Chilton, Keyport, N. J., assignor, by mesne assignments, to Eclipse Machine Company, Elmira Heights, N. Y., a corporation of New York Application January 30, 1929, Serial No. 336,310
Renewed November 30, 1934

8 Claims. (Cl. 123—179)

This invention relates to starters for internal combustion engines of the type embodying an inertia member or flywheel.

One of the objects of the invention is to provide a novel inertia or flywheel starter which is reliable in operation and of simple design and few parts.

Another object is to provide a starter of the type embodying a flywheel having a novel arrangement of parts whereby compactness and small overall dimensions are obtained. Other objects will appear more fully hereinafter.

One embodiment of the invention has been illustrated in the accompanying drawing, which is a sectional side elevation of one form of the invention with certain parts shown in full, but it is to be expressly understood that said drawing is for purposes of illustration only and is not to be construed as a definition of the limits of the invention, reference being had to the appended claims for this purpose.

In the form shown in the drawing, the starter mechanism is housed in any suitable casing or housing, which as shown is of light metal and comprises two cooperating housing parts 1 and 2, the part 1 being preferably secured to the casing 3 of an engine in any suitable manner, as by means of bolts 4. The part 2 of the casing is provided with a substantially circular well or depression 5 in which is rotatably mounted a flywheel 6 of relatively small size and light weight. In the form shown, the flywheel 6 is mounted on a shaft 7, one end of which is supported in ball bearings 8 mounted in the casing, the other end of said shaft being supported in a ball bearing 9 as hereinafter described.

At the other side of the casing, and preferably in axial alinement with the shaft 7, is a rotatable and axially displaceable member adapted to engage the shaft of an engine to be started. In the form shown, the casing part 1 is provided with a seat 10 for a ball bearing 11, held in place by means of a retaining ring 12 and screws 13. Ball bearing 11 supports a barrel or sleeve 14, within which is a shaft 15 splined to said barrel at 16. The outer end of the shaft 15 is provided with teeth 17 of any suitable type adapted to engage corresponding teeth 18 formed on the end of a shaft 19 of an engine to be started. Any suitable means may be provided for shifting the shaft 15 axially to engage the teeth 17 and 18, and as shown, a ring 20 threaded on the outer end of the shaft 15 is provided with a groove 21 adapted to receive a fork or other shifting member. The inner end of the barrel 14 supports the ball bearing 9, above referred to, which provides a bearing for the inner end of the shaft 7.

The flywheel 6 is drivingly connected to the shaft 15 through suitable gearing so that energy stored in the flywheel 6 by rapidly rotating the same may be used to turn over the engine shaft 19, when the shaft 15 is shifted to engage the teeth 17 and 18. In the form shown, the barrel 14 carries a circular plate or flange 22, preferably integral therewith, which together with a retaining ring 23 threaded on said barrel serves to hold the latter against movement axially relative to the ball bearing 11. A toothed rim 24 is suitably secured to the periphery of the plate 22, as by means of bolts or rivets 25. The gear constituted by toothed rim 24 meshes with teeth 26 formed on a lay or countershaft 27 having its ends mounted in ball bearings 28 and 29 carried respectively by the casing parts 1 and 2, and adapted for limited longitudinal movement therethrough. The shaft 27 carries a gear 30 which meshes with teeth 31 formed on the flywheel shaft 7. Owing to the two-step reduction formed by gears 30 and 31 and gears 24 and 26, the flywheel 6 rotates at much greater speed than the shaft 15.

If the teeth 17 and 18 are meshed suddenly while the flywheel 6 is rotating at high speed, the initial resistance to turning of engine shaft 19 may be so great as to cause breaking of some of the parts, and to this end a yieldable driving connection is interposed in the gear train between the flywheel 6 and the shaft 15. Preferably the yieldable driving connection is so disposed with relation to the cooperating elements of the gear train as to make it possible to provide a novel method of setting the gears, characterized by the fact that the gears are first assembled with the yieldable parts interposed between the cooperating elements of an intermediate gear set, such assembly of the gears being effected prior to setting of the clutch. In this way all necessity for accurate angular relationship between the gear and pinion teeth is avoided as the clutch may be tightened after the gears have been meshed, whereupon they will assume their natural positions and no tooth element can be loaded and stressed beyond the slipping point of the clutch means which drives it; moreover this method of setting the gears minimizes the danger of corner tooth contact and distortion or bending of the relatively slender pinions 31 and 26. To this end, the gear 30 is mounted loosely on the shaft 27, and is provided with a tubular extension 32 carrying a plurality of annular friction plates 33 through which the shaft 27 passes freely. A similar number of friction plates 34, splined to the shaft 27, alternate with the plates 33. Suitable means are provided for maintaining the plates 33 and 34 in frictional engagement, and in the form shown such means are resilient and adjustable to vary the load at which plates 33 and 34 will slip relative to one another. As shown, an end plate 35 is carried by the shaft 27 on one side of the plates 33 and 34, said plate 35 being splined to said shaft and seated against a shoulder formed by the teeth 26. The gear 30, on the other side of the friction plates 33 and 34, is resiliently urged toward the plate 35 by means of a dished spring plate 36 interposed between the gear 30 and the ball bearing 29. The end of the shaft 27 projects through the ball bearing 29 and is threaded to receive a nut 37 which can be tightened from a position outside the housing, after the gears and cooperating parts have been installed. This tightening action serves to increase the pressure of the spring plate 36. As will be seen from the drawing, nut 37 bears against the inner race of bearing 29 in such a manner that when the nut is tightened, shaft 27 is moved longitudinally to the right, as viewed in the drawing, through said bearing, carrying with it the clutch assembly and gear 30, and increasing the pressure of spring plate 36 by tending to flatten it between said gear and bearing 29.

In the embodiment of the invention shown, the flywheel 6 is preferably adapted to be manually put in rotation, and consequently a hand crank or the like is required which may be rotated at comparatively low speed. Accordingly, the inner end of the barrel 14 is threaded and carries a pinion 38 meshing with a pinion or worm gear 39. The gear 39 is recessed to provide a seat 40 for a ball bearing 41 held in place by a retaining ring 42, and the ball bearing 41 is mounted on a pin or bolt 43 threaded in a bracket 44 forming a part of the casing part 2. A worm 45 mounted on a shaft 46 meshes with the worm gear 39, and the shaft 46 may be provided with a suitable hand crank or the like (not shown) whereby the worm 45 may be rotated.

When it is desired to use the starter, the teeth 17 and 18 being disengaged, the shaft 46 is rotated by hand. The worm 45 acts through the worm gear 39 and pinion 38 to rotate the barrel 14 and the shaft 15, and through the gear 24, teeth 26, friction clutch 33, 34, gear 30, and teeth 31, to rotate the flywheel 6. When the speed of rotation of the flywheel is sufficiently high, the shaft 15 is shifted axially on the splines 16 to engage the teeth 17 and 18. The energy stored in the rotating flywheel 6 turns over the engine shaft 19, the friction clutch 33, 34 yielding under the initial load until shaft 19 rotates sufficiently to decrease the load below the point at which said clutch is adjusted to slip. When the engine starts, the engine shaft 19 overruns the shaft 15, and owing to the shape of the teeth 17 and 18, shaft 15 is forced axially backward into the position shown in the drawing where the teeth 17 and 18 are disengaged.

The starter above described, while rugged and reliable in operation, is of simple design and has few parts. Moreover, owing to the arrangement of the parts, and in particular to the coaxial arrangement of the flywheel and engine engaging shaft, the mechanism is very compact and of small size. The reduction of overall dimensions which results from the novel arrangement of the apparatus is particularly important, because the amount of space which can be devoted to apparatus of this character, especially in automobile and aeroplane engines, is usually limited. Moreover, while the starter is sufficiently small to be suitable for the lightest service engines, it also has sufficient power to operate any of the larger power plants ordinarily used, so that only one type of starter is required. This feature results in increased quantity production and low unit cost, both of the original apparatus and of repair or replacement of parts, and decreases service difficulties.

While only one embodiment of the invention has been illustrated and described, it is to be expressly understood that the invention is capable of a variety of mechanical expressions, and that changes may be made in the form, detail and arrangement of the parts, without departing from the spirit of the invention. Reference is therefore to be had to the appended claims for a definition of the limits of the invention.

What is claimed is:

1. In combination with a driven member, a driving member and a train of reduction gearing drivably connecting said driving and driven members, a rotatable and longitudinally movable shaft, yieldably engaged elements carried by said shaft and interposed in said train of gearing, resilient means maintaining said elements in engagement, a fixed abutment for said resilient means, and means for longitudinally moving said shaft to adjust said resilient means after all parts have been assembled.

2. In combination with a driven member, a driving member and a train of reduction gearing drivably connecting said driving and driven members, a rotatable and longitudinally movable shaft, a friction clutch carried by said shaft and interposed in said train of gearing, said clutch comprising frictionally engaged elements, a stationary abutment, resilient means interposed between said abutment and said elements, and means for moving said shaft longitudinally relative to said abutment, whereby the tension of said resilient means is varied after all parts have been assembled.

3. In apparatus of the class described, the combination of driving and driven members and a housing therefor, a connecting shaft, one end of which projects from said housing, a friction plate carried by said shaft, a gear having a hub mounted loosely on said shaft and a tubular extension substantially intermediate its hub and teeth, said extension being laterally offset from said hub and teeth, a cooperating friction plate carried by said extension, resilient means maintaining sa'" plates in engagement, and means engageable with the projecting end of said shaft to hold said resilient means under tension.

4. In apparatus of the class described, the combination of driving and driven members and a connecting shaft, a friction plate carried by said shaft, a gear having a hub mounted loosely on said shaft and a tubular extension substantially intermediate its hub and teeth, said extension being laterally offset from said hub and teeth, a cooperating friction plate carried by said extension, a stationary abutment, resilient means interposed between said abutment and said gear, and means for moving said shaft longitudinally after all parts have been assembled.

5. In apparatus of the class described, the combination of driving and driven members and a connecting shaft, a friction plate carried by said shaft, a gear having a hub mounted loosely on said shaft and a tubular extension substantially intermediate its hub and teeth, said extension being laterally offset from said hub and teeth, a cooperating friction plate carried by said extension, a bearing rotatably supporting said shaft, a resilient plate abutting said bearing at its center and said gear at its periphery, and means abutting the other face of said bearing for adjusting the pressure exerted on said friction plate by said resilient plate, said means consisting of a single nut adjustable after all parts have been assembled.

6. In apparatus of the class described, the combination of driving and driven members and a connecting shaft, one end of which projects beyond said housing, a friction plate carried by said shaft, a gear mounted loosely on said shaft, a cooperating friction plate carried by said gear, a bearing rotatably supporting said shaft, a resilient plate abutting said bearing at its center and said gear at its periphery, and means abutting the other face of said bearing for adjusting the pressure exerted on said friction plates by said resilient plate, said adjusting means including a nut threaded to the projecting end of said shaft, and a pinion formed near the other end thereof, said pinion being movable relatively to said friction plates in response to rotation of said nut.

7. In apparatus of the class described, the combination of driving and driven members and a connecting shaft, a friction plate carried by said shaft, a gear having a hub mounted loosely on said shaft and a tubular extension substantially intermediate its hub and teeth, said extension being laterally offset from said hub and teeth, a cooperating friction plate carried by said extension, resilient means maintaining said plates in engagement, and means accessible externally of said housing for adjusting the stress in said resilient means, said means including a single nut engageable with said shaft.

8. In a device of the class described, the combination of a high speed pinion, a main driven gear coaxial therewith, a layshaft comprising a pinion meshed with said gear, a second gear meshed with said high speed pinion, a friction driving connection between said second gear and layshaft, and means threadedly engaging one end of said layshaft for maintaining a predetermined torque transmitting capacity in said friction driving connection, said means including a nut manipulable from outside the gear housing, after assembly of all moving parts.

ROLAND CHILTON.